(12) United States Patent
Dao et al.

(10) Patent No.: US 9,898,122 B2
(45) Date of Patent: Feb. 20, 2018

(54) TOUCH-SCREEN DEVICE AND METHOD FOR DETECTING AND IGNORING FALSE TOUCH INPUTS NEAR AN EDGE OF THE TOUCH-SCREEN DEVICE

(75) Inventors: Kevin H. Dao, Skokie, IL (US); Chien-Hui Wen, Vernon Hills, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 13/106,058

(22) Filed: May 12, 2011

(65) Prior Publication Data

US 2012/0287076 A1    Nov. 15, 2012

(51) Int. Cl.
*G06F 3/041*    (2006.01)
*G06F 1/16*    (2006.01)
*G06F 3/0488*    (2013.01)

(52) U.S. Cl.
CPC .......... *G06F 3/0416* (2013.01); *G06F 1/1626* (2013.01); *G06F 1/1643* (2013.01); *G06F 1/1684* (2013.01); *G06F 3/0488* (2013.01); *G06F 2203/04808* (2013.01)

(58) Field of Classification Search
CPC .... G06F 3/0488; G06F 3/044; G06F 3/03547; G06F 3/038
USPC .................................................. 345/156, 173
See application file for complete search history.

(56) References Cited

U.S. PATENT DOCUMENTS

| 8,519,971 B1* | 8/2013 | Mackraz ................. G06F 3/147 313/504 |
| 2006/0109252 A1* | 5/2006 | Kolmykov-Zotov et al. ............................ 345/173 |
| 2006/0197750 A1* | 9/2006 | Kerr et al. .................... 345/173 |
| 2006/0238517 A1* | 10/2006 | King et al. .................... 345/173 |
| 2009/0174679 A1* | 7/2009 | Westerman ................... 345/173 |
| 2010/0032891 A1 | 2/2010 | Parivar |
| 2010/0134423 A1 | 6/2010 | Brisebois et al. |
| 2010/0134424 A1 | 6/2010 | Brisebois et al. |
| 2010/0141603 A1* | 6/2010 | Hotelling ...................... 345/173 |
| 2011/0018835 A1 | 1/2011 | Murai et al. |
| 2011/0069021 A1* | 3/2011 | Hill .............................. 345/173 |
| 2011/0148915 A1* | 6/2011 | Kim ............................. 345/619 |
| 2011/0199338 A1 | 8/2011 | Kim |
| 2011/0285645 A1* | 11/2011 | Cho et al. ..................... 345/173 |
| 2012/0023459 A1* | 1/2012 | Westerman ......... G06F 3/03547 715/863 |

(Continued)

FOREIGN PATENT DOCUMENTS

EP    2434385 A2    3/2010

OTHER PUBLICATIONS

Patent Cooperation Treaty, International Search Report and Written Opinion of the International Searching Authority for International Application No. PCT/US2012/034753, dated Jun. 29, 2012, 11 pages.

(Continued)

*Primary Examiner* — Nelson Rosario
*Assistant Examiner* — Chun-Nan Lin
(74) *Attorney, Agent, or Firm* — Colby Nipper (57) ABSTRACT

A touch-screen device and method for operating a touch-screen device are provided herein. The touch device comprises sensors around the edge and/or on the back of the device that will determine where a user is holding the device. Based on this information certain areas of the touch screen will be ignored or inactivated. This allows the device to selectively ignore the touch of the thumb and or palm.

20 Claims, 5 Drawing Sheets

(56) References Cited

U.S. PATENT DOCUMENTS

2012/0032979 A1* 2/2012 Blow .................. G06F 1/1626
  345/647
2012/0154294 A1* 6/2012 Hinckley .............. G06F 1/1649
  345/173

OTHER PUBLICATIONS

Communication pursuant to Article 94(3) EPC for EP Patent Application 12721061.5, dated Mar. 27, 2015, 5 pages.
Office Action for EP Application No. 12721061.5, dated Feb. 10, 2016, 6 pages.

* cited by examiner

TOUCH-SCREEN DEVICE AND METHOD FOR DETECTING AND IGNORING FALSE TOUCH INPUTS NEAR AN EDGE OF THE TOUCH-SCREEN DEVICE

FIELD OF THE INVENTION

The present invention relates generally to touch-screen devices and in particular, to a touch-screen device, and method for operating a touch-screen device.

BACKGROUND OF THE INVENTION

Figure 1:
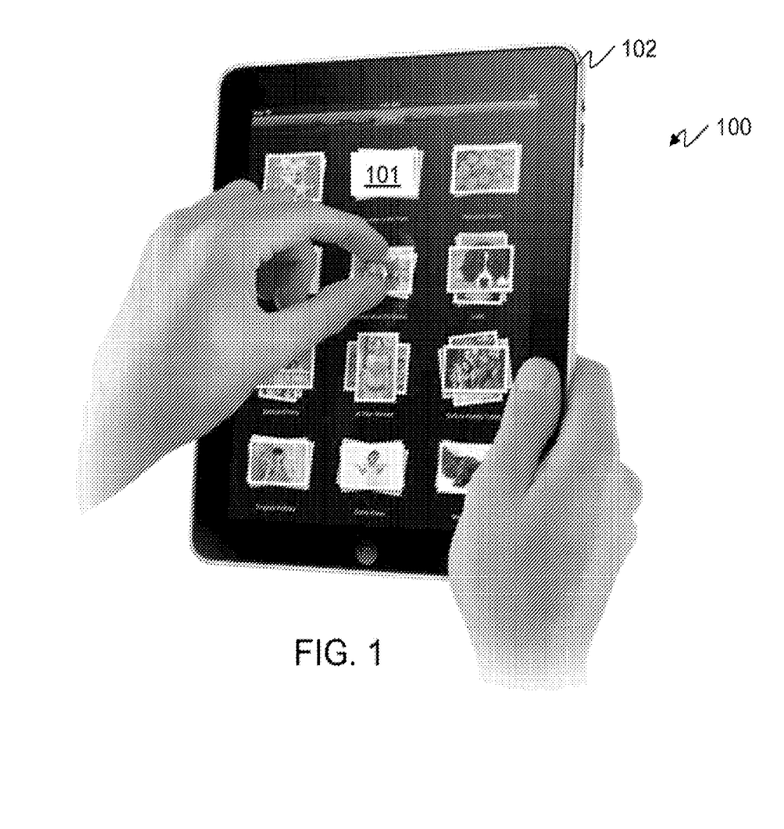
FIG. 1 illustrates a touch-screen device.

Touch tablet devices are quickly becoming a must-have for consumers. These devices typically comprise a hand-held computer having a touch screen that can be accessed by the user simply by touching an area of the screen. Such a device is shown in FIG. 1. As is evident, tablet 100 generally comprises touch panel/display 101 and border 102. A typical user holds the device in a similar manner as shown in FIG. 1. With a small border 102, the user's thumb has the potential of falsely inputting a touch to panel 101. In order to shrink these devices, while keeping a large display area, it is necessary to shrink the border. However, a large border allows a user to hold the device without sending touch inputs through the touch panel. Therefore a need exists for a method and apparatus for a touch-screen device, and method for operating a touch-screen device that has a small border, yet minimizes false inputs to the touch screen.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to alleviate the above-mentioned need, a touch-screen device and method for operating a touch-screen device are provided herein. The touch device comprises sensors around the edge and/or on the back of the device that will determine where a user is holding the device. Based on this information certain areas of the touch screen will be ignored or inactivated. This allows the device to selectively ignore the touch of the thumb and or palm.

Because a user can hold the touch-screen device without causing an input to the touch screen, the touch screen device can be designed with a slimmer border. Additionally, a user can hold the device within the active area of the touch-screen without affecting any intended functionality.

The present invention encompasses a touch screen device comprising a touch screen, a sensor sensing a user's hand gripping the device, and outputting information regarding a location of a user's hand, and a processor determining an area of the touch screen to ignore inputs based on the information regarding the location of the user's hand.

The present invention additionally encompasses a method comprising the steps of determining a location of a user's hand gripping a device, determining an input on a touch screen, and determining an area of the touch screen to ignore based on the location of the user's hand gripping the device.

The present invention additionally encompasses a method comprising the steps of determining a location of a user's hand gripping a device, determining an input on a touch screen, and determining an area of the touch screen to ignore based on the location of the user's hand gripping the device. The step of determining the area of the touch screen to ignore comprises the step of determining if the area is a predetermined distance from a device edge and determining if the area to ignore is along a same device edge as the location of a user's hand.

Figure 2:
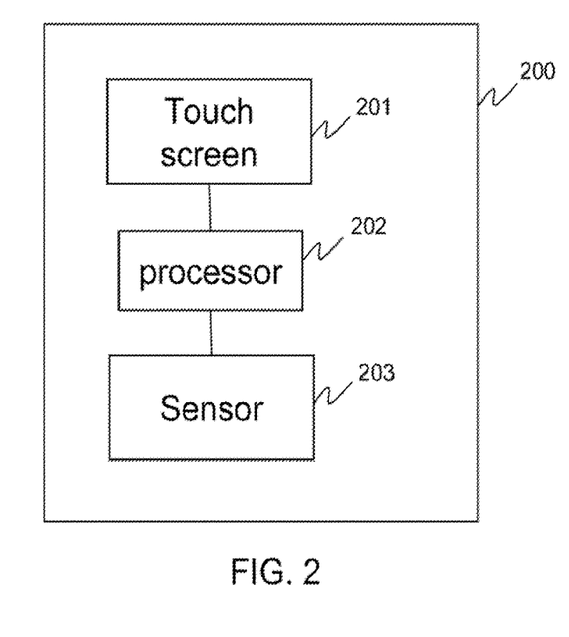
FIG. 2 is a block diagram of a touch-screen device.

Turning now to the drawings, where like numerals designate like components, FIG. 2 is a block diagram showing touch-screen device 200. Touch-screen device 200 preferably comprises a modified MOTOROLA™ Xoom tablet. As shown, device 200 comprises touch screen 201, processor 202, and sensor 203. Touch-screen 201 preferably comprises a combination of a PET/film/glass, ITO touch sensor manufactured by TPK Touch Solutions and an Atmel® mXT1386 controller. Processor 202 preferably comprises an NVIDIA® Dual-core Tegra® 2 processor. Processor 202 determines an area of the touch screen to ignore inputs based on the information regarding the location of the user's hand. Finally sensor 203 preferably comprises any suitable sensor that can detect the presence of a user's hand, palm, or thumb gripping device 200, and output information regarding the location of the user's hand. In a first embodiment, sensor 203 comprises a capacitive sensor manufactured by TPK Touch Solutions. In alternate embodiments of the present invention, sensor 203 may comprise any capacitive sensor, resistive sensor, thermal sensor, IR sensor, or any pressure sensitive touch mechanism on the side and/or the back of device 200.

As mentioned above, a typical user holds device 200 in a similar manner as shown in FIG. 1. With a small border, the user's thumb has the potential of falsely inputting a touch as an input to touch screen 201. In order to address this issue, sensor 203, in conjunction with Touch-screen 201 will detect the location of a user's hand, thumb, and/or palm and notify processor 202 of the location. Processor 202 will receive this information and selectively ignore any touch to screen 201 in the area of the user's hand, thumb, or palm. This is illustrated in FIG. 3 and FIG. 4.

Figure 3:
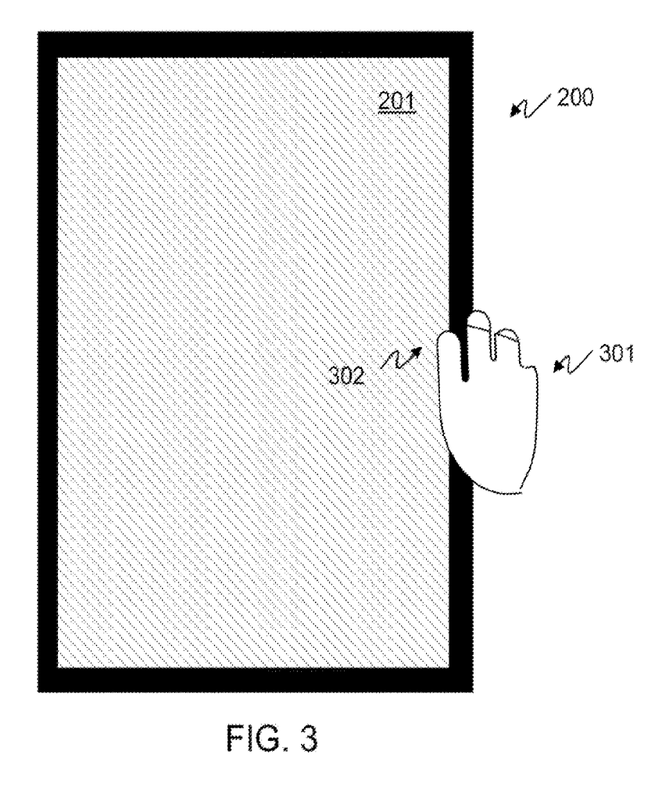
FIG. 3 illustrates a user gripping the touch-screen device of FIG. 2.
Figure 4:
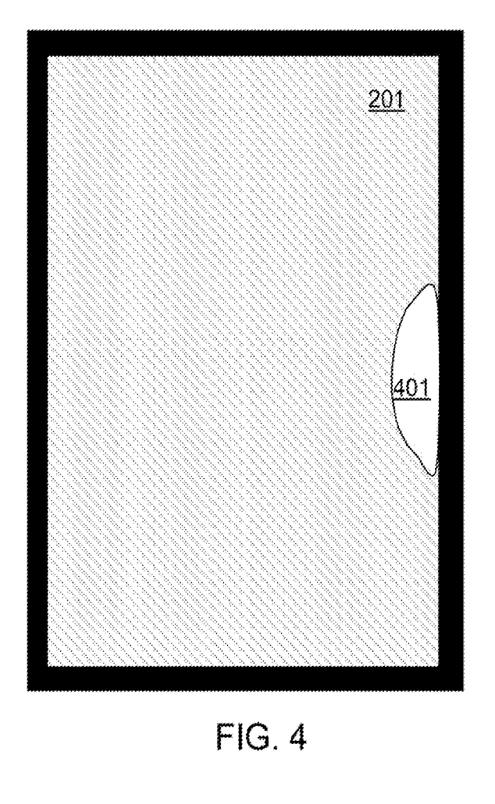
FIG. 4 illustrates an area of a touch screen that is ignored.

As shown in FIG. 3, a user's hand 301 is gripping an edge of device 200, and may be in contact with touch screen 201 near point 302. To prevent inputting a false touch to touch screen 201, processor will ignore touches to screen 201 in the area of hand 301. This is illustrated in FIG. 4. As shown in FIG. 4, any input from area 401 will be ignored by processor 202.

Figure 5:
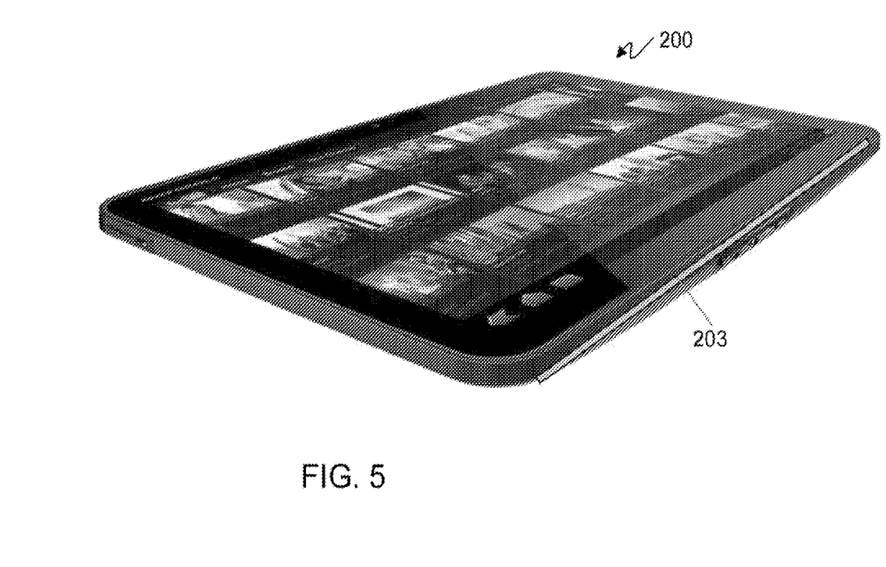
FIG. 5 illustrates a touch-screen device having a touch sensor around a perimeter of the device.

Placement of Sensors:

FIG. 5 illustrates placement of sensor 203 on device 200 in accordance With a first embodiment. In the first embodiment, sensor 203 exists on an edge, and/or side of device 200. In one particular embodiment, sensor 203 is located on an edge of the device's housing. Sensor 203 preferably comprises a strip of capacitive sensor that is placed to capture a location of a user's palm when holding device 200. In alternate embodiments, sensor 203 may comprise a strip of resistive sensor, thermal sensor, pressure sensor or IR sensor. Although FIG. 5 shows strip sensor 203 existing on a single edge of device 200, in alternate embodiments sensor 203 may exist on multiple edges of device 200 simultaneously.

Figure 6:
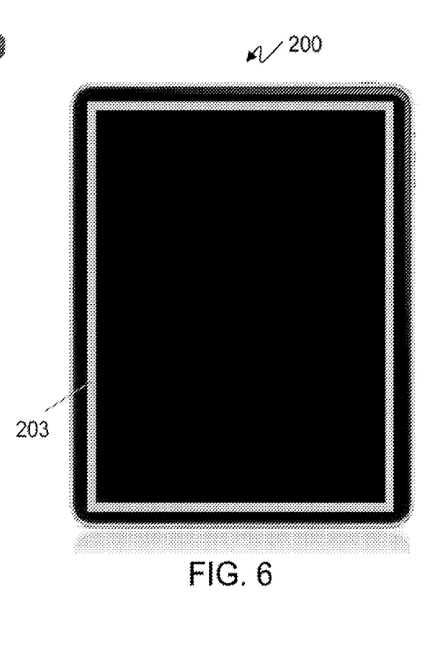
FIG. 6 illustrates a touch-screen device having a touch sensor around a back of the device.

FIG. 6 illustrates placement of sensor 203 on device 200 in accordance with a second embodiment. In the second embodiment, sensor 203 exists on a back side of device 200. In one particular embodiment, sensor 203 is located on a back of device 200 housing, or located on an opposite side of the housing from the touch screen 201. As shown, sensor 203 preferable comprises a strip of capacitive sensor that is placed to capture a location of a user's hand when holding device 200.

Figure 7:
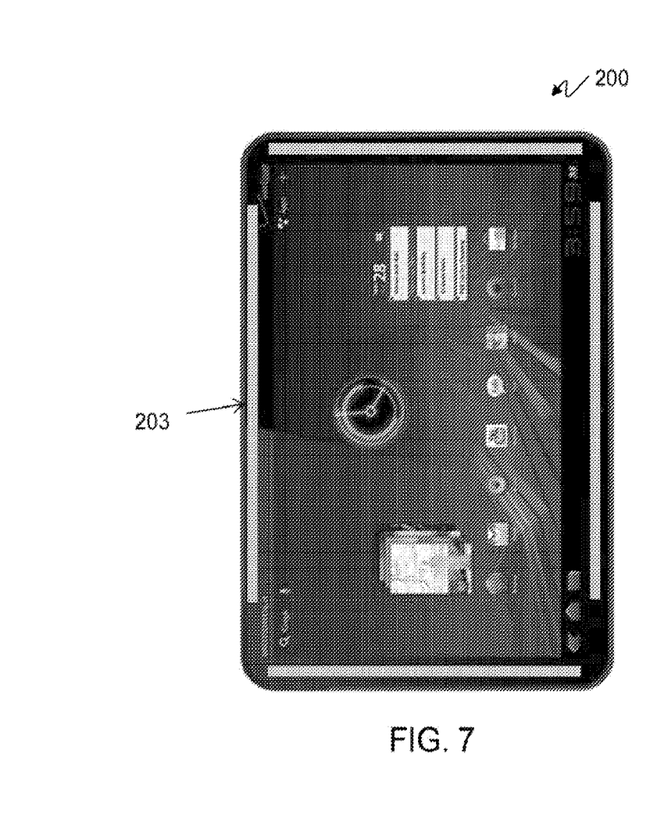
FIG. 7 illustrates a touch-screen device having a touch sensor at a side of the device, the sensor under, or on top of, a border of the device.

FIG. 7 illustrates placement of sensor 203 on device 200 in accordance with a third embodiment. In the third embodiment, sensor 203 exists at the side of device 200, under or on top of the border of device 200. As shown, sensor 203 preferable comprises a strip of capacitive sensor that is placed to capture a location of a user's hand when holding device 200.

Determination of Area to Ignore:

Area 401 in FIG. 4 represents a region where a user's hand, thumb, palm, or combination of comes into contact with touch screen 201 as a result of holding device 200. Area 401 comprises only a portion of touch screen 201. When the user's hand, thumb, palm, or combination of is making contact within the active area of touch screen 201, touch screen 201 will calculate all these touch point data and send to processor 202. These touch point data constitute the boundary and size of area 401.

Figure 8:
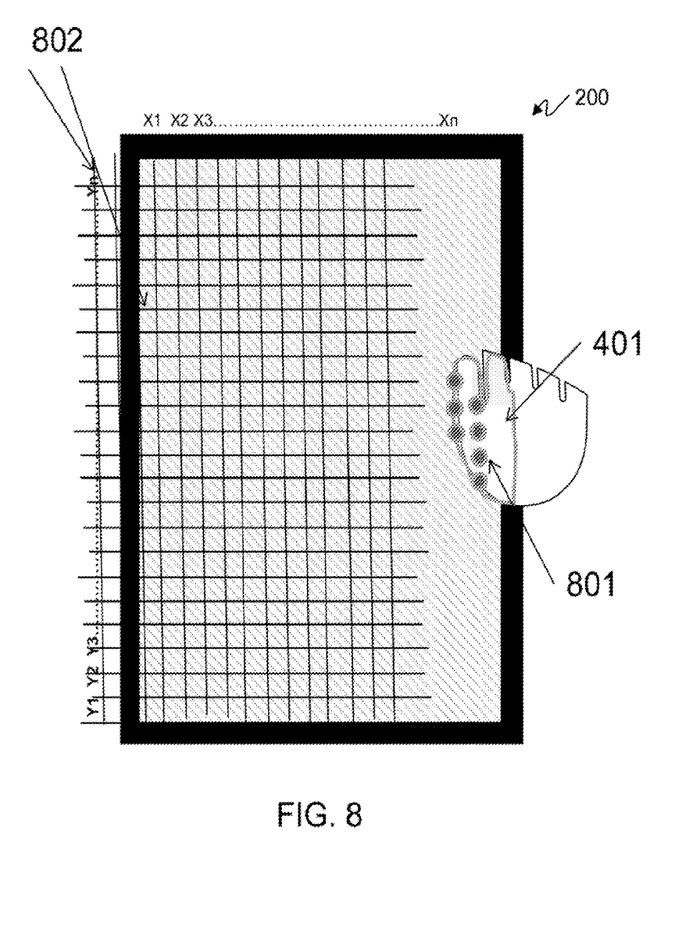
FIG. 8 illustrates an example technique for determining the area of the touch screen that is ignored.

FIG. 8 illustrates an example of how area 401 can be determined. Lines 802 indicate the ITO-sensor lines on touch screen 201. As the user's hand, thumb, palm, or combination of comes into contact with touch screen 201, lines 802 will detect the change in capacitance between X and Y at the locations of where the user is making contact with touch screen 201. The result is a series of (X,Y) position points, shown as 801, that will map out the boundary and shape of Area 401. These data points are sent to processor 202. If input from sensor 203 is valid (i.e., sensor 203 detects the presence of a hand/palm), processor 202 will deem these data points from touch screen 201 as a result of a user holding device 200 and will ignore this area 401. If input from sensor 203 is not valid, then processor 202 will deem these data points from touch screen 201 as valid input and proceed with the execution of the intended touches to area 401 from the user.

Area 401 can be generated within any location of touch screen 201 with the method just described above, however, in a preferred embodiment of the present invention, area 401 is considered for ignoring when area 401 is within a predetermined distance from the edge of device 200 and if area 401 is along a same edge as a detected palm/hand. In other words, processor 202 determines area 401 by determining if an area being contacted is a predetermined distance from a device edge. For example, if area 401 is within ½ inch of the device edge, it will be considered for ignoring. If however, area 401 is greater than ½ inch from the edge of device 200, it will not be considered for ignoring.

In a similar manner, if area 401 is along a same edge as a detected hand/palm it will be considered for ignoring, however, if area 401 is not along a same edge of a detected hand/palm, it will not be considered for ignoring. In other words, processor 202 determines area 401 by determining if an area being contacted is along a same device edge as the location of a user's hand (determined by sensor 203). Thus in this embodiment, any activated area within a predetermined distance from the edge of device 200 and existing along a same edge as a hand/palm detection will be ignored if sensor 203 detects the presence of a hand/palm.

Figure 9:
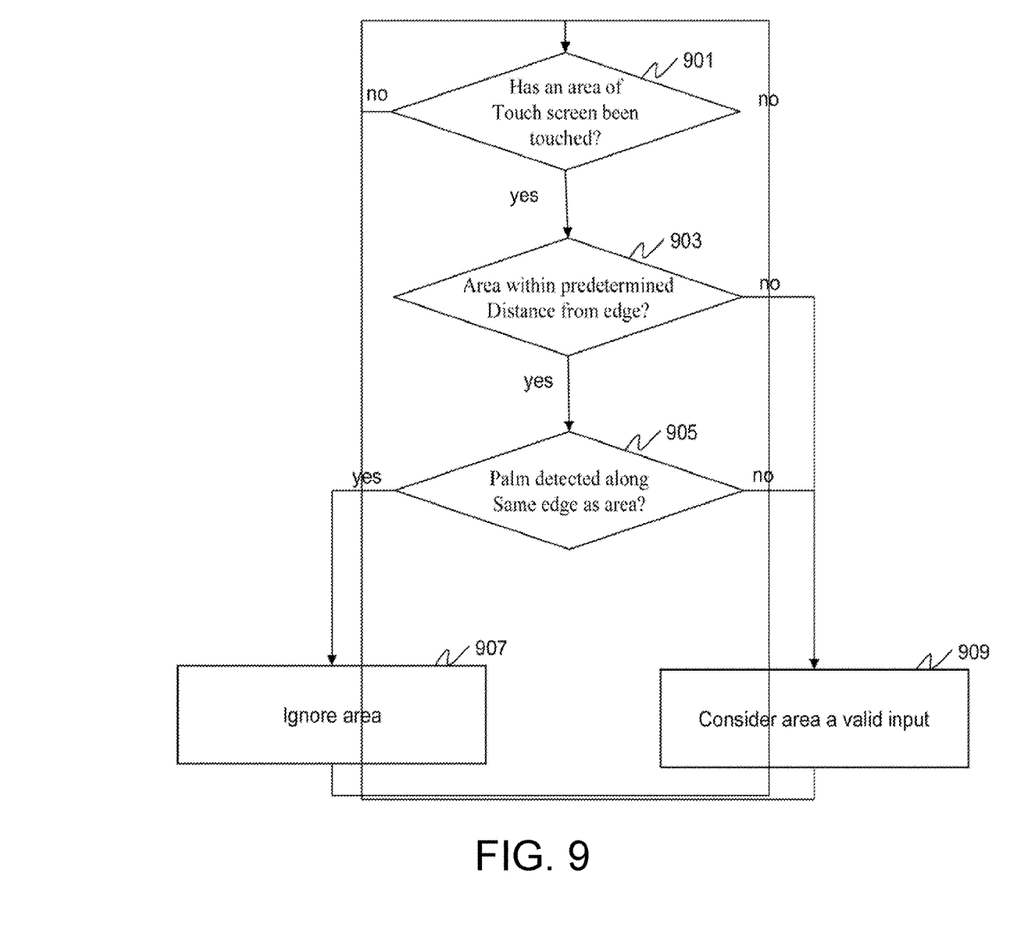
FIG. 9 is a flow chart showing operation of the touch-screen device of FIG. 2.

FIG. 9 is a flow chart showing operation of the touch-screen device of FIG. 2. The logic flow begins at step 901 where touch screen 201 determines if area 401 of touch screen 201 has been touched by determining if there was received an input on touch screen 201. If not, the logic flow returns to step 901. If so, the logic flow continues to step 903 where processor 202 receives a notification of the touch and determines if area 401 of the touch is within a predetermined distance from the edge of device 200. If the area 401 is not within a predetermined distance from the edge of device 200, the logic flow continues to step 909. If area 401 is within a predetermined distance from the edge of device 200, the logic flow continues to step 905 where processor 202 accesses sensor 203 to determine a location of a user's hand gripping the device and determine if a palm/hand was detected along a same edge as area 401. If so, area 401 is ignored (step 907) otherwise, area 401 is considered a valid input (step 909). At step 907 processor 202 determines an area of the touch screen to ignore based on the location of the user's hand gripping the device.

While the invention has been particularly shown and described with reference to a particular embodiment, it will be understood by those skilled in the art that various changes in form and details may be made therein without departing from the spirit and scope of the invention. It is intended that such changes come within the scope of the following claims:

The invention claimed is:

1. A touch screen device comprising:
   a touch screen including a plurality of sensors arranged in X and Y coordinates defining a touch display area and configured to detect touch inputs;
   a housing, at least a portion of the touch screen being incorporated as part of a front surface of the housing, the housing having a back surface opposite the front surface, and a side surface extending between the front surface and the back surface;
   a strip sensor at an edge or border of the touch screen device extending longitudinally along and outside the touch display area, the strip sensor configured to sense a user's hand gripping the touch screen device at the edge or border, and output information regarding a location of the user's hand on the strip sensor; and a processor configured to:

map a contour of an area of the touch display area receiving touch inputs and adjacent the location of the user's hand on the strip sensor by at least:

receiving, from the plurality of sensors, touch point data corresponding to a region of the touch display area that is in contact with a part of the user's hand;

determining, from the touch point data, a shape and a perimeter of the region of the touch display area that is in contact with the part of the user's hand; and using the determined shape and perimeter of the region as the contour of the area of the touch display area;

determine that the area of the touch display area is within a predetermined distance from the edge or border of the touch screen device and on a same side as the location of the user's hand; and ignore active touch inputs received within the area of the touch display area that are within the predetermined distance and while the user's hand continues to be sensed using the strip sensor.

2. The device of claim 1 wherein the strip sensor comprises a capacitive sensor.

3. The device of claim 1 wherein the strip sensor comprises a resistive sensor.

4. The device of claim 1 further comprising:
a housing, the touch screen being incorporated as part of a front surface of the housing, the housing having a back surface opposite the front surface, and at least one side surface extending between the front surface and the back surface, the strip sensor being located on the at least one side surface of the housing.

5. The device of claim 1 further comprising:
a housing, the touch screen being incorporated as part of a front surface of the housing, the housing having a back surface opposite the front surface, and at least one side surface extending between the front surface and the back surface, the strip sensor being located on the back surface.

6. The device of claim 1 further comprising:
a housing, the touch screen being incorporated as part of a front surface of the housing, the housing having a back surface opposite the front surface, and a side surface extending between the front surf ace and the back surface,
the processor configured to determine if the area of the touch display area and the location of the user's hand are both along the side surface of the housing.

7. The device of claim 1, the processor further configured to ignore active touch inputs in another area of the touch display area defined only in part by the area.

8. The device of claim 1 wherein the strip sensor comprises a thermal sensor.

9. The device of claim 1 wherein the strip sensor comprises an IR sensor.

10. The device of claim 1, wherein the strip sensor has a first portion disposed on a first side of the touch screen and a second portion disposed on a second side of the touch screen.

11. The device of claim 10, wherein the strip sensor has a continuous portion disposed along substantially all of a side of the touch screen display.

12. A method comprising:
determining a location of a hand of a user gripping a device via an elongated strip sensor that is separate from a touch screen defined by a plurality of sensors in X and Y coordinates defining a display area within a boundary of the touch screen, the strip sensor being adapted for sensing in an area outside of the boundary of the touch screen, the device including a housing having at least a portion of the touch screen incorporated as part of a front surface of the housing, the housing additionally having a back surface opposite the front surface and one or more side surfaces extending between the front surface and the back surface;

mapping a contour of a plurality of active inputs within the boundary of the touch screen by at least:

receiving, from the plurality of sensors, touch point data corresponding to a region of the touch screen that is in contact with a part of the hand of the user;

determining, from the touch point data, a shape and a perimeter of the region of the touch screen that is in contact with the part of the hand of the user; and using the determined shape and perimeter of the region as the contour of the plurality of active inputs;

determining that the contour of the plurality of active inputs is within a predetermined distance from the boundary of the touch screen and on a same side as the location of the hand of the user; and determining that the mapped plurality of active inputs within the boundary of the touch screen are to be ignored based on:

the location of the hand of the user continuing to be determined, using the strip sensor; and the mapped plurality of active inputs within the boundary of the touch screen being within the predetermined distance.

13. The method of claim 12 wherein the determining that the mapped plurality of inputs to ignore comprises determining if a portion of the touch screen is along a same side surface of the housing of the device as the sensed location of the hand of the user.

14. The method of claim 12 wherein the determining the location of the hand of the user gripping the device comprises determining the location via the strip sensor, where the strip sensor is located on the side surface of the housing of the device.

15. The method of claim 12 wherein the determining the location of the hand of the user gripping the device comprises determining the location via the strip sensor, where the strip sensor is located on the back surface of the housing of the device.

16. The method of claim 12, wherein the strip sensor has a first portion disposed on a first side of the touch screen and a second portion disposed on a second side of the touch screen.

17. The method of claim 12 wherein the strip sensor comprises a capacitive sensor, a resistive sensor, a thermal sensor, or an IR sensor.

18. A method in a device having a housing with at least a portion of a touch screen incorporated at a front surface of the housing, the housing additionally having a back surface opposite the front surface, and one or more side surfaces extending between the front surface and the back surface, the method comprising:

determining a location of a hand of a user gripping the device via an elongated strip sensor, separate from the touch screen including a plurality of touch-display elements arranged according to X and Y coordinates, the strip sensor being adapted for sensing in an area outside of a boundary of the touch screen; and mapping a contour of an area of active inputs on the touch screen within the boundary of the touch screen by at least:
　receiving, from the plurality of touch-display elements, touch point data corresponding to a region of the touch screen that is in contact with a part of the hand of the user;
　determining, from the touch point data, a shape and a perimeter of the region of the touch screen that is in contact with the part of the hand of the user; and
　using the determined shape and perimeter of the region as the contour of the area of active inputs;
determining that the contour of the area of active inputs is within a predetermined distance from the boundary of the touch screen and on a same side as the location of the hand of the user; and
ignoring the mapped area of active inputs when the mapped inputs are within a predetermined distance from a same side surface of the housing of the device as the sensed location of the hand of the user.

19. The method of claim 18, wherein the strip sensor has a first portion disposed on a first side of the touch screen and a second portion disposed on a second side of the touch screen.

20. The method of claim 18 wherein the strip sensor comprises a capacitive sensor, a resistive sensor, a thermal sensor, or an IR sensor.

* * * * *